United States Patent [19]

Kuwahara et al.

[11] Patent Number: 4,862,760
[45] Date of Patent: Sep. 5, 1989

[54] SHIFT LEVER ASSEMBLY AND METHOD OF ASSEMBLING

[75] Inventors: Wataru Kuwahara; Etsuo Shirai; Hiroaki Nagamatsu; Kazuhiko Moriyama, all of Hiroshima, Japan

[73] Assignee: Mazda Motor Corporation, Hiroshima, Japan

[21] Appl. No.: 79,085

[22] Filed: Jul. 29, 1987

[30] Foreign Application Priority Data

Aug. 9, 1986 [JP] Japan .................. 61-122293[U]

[51] Int. Cl.$^4$ ............................................. G05G 9/00
[52] U.S. Cl. ............................ 74/473 R; 74/473 P; 403/324; 403/374; 411/354; 411/356
[58] Field of Search ............... 74/473 P, 473 R, 524; 403/324, 374, 378, 379; 411/354, 355, 356, 357, 426

[56] References Cited

U.S. PATENT DOCUMENTS

| | | | |
|---|---|---|---|
| 1,365,870 | 1/1921 | Temple | 411/426 |
| 1,638,182 | 8/1927 | Butell | 74/473 R |
| 1,749,828 | 3/1930 | Maier | 74/473 R |
| 1,780,898 | 11/1930 | Blood et al. | 74/473 R |
| 1,927,646 | 9/1933 | Miller | 74/473 P |
| 4,171,822 | 10/1979 | Thun | 280/259 |
| 4,492,129 | 1/1985 | Hasegawa | 74/473 R |
| 4,576,504 | 3/1986 | Hartman | 403/318 |
| 4,579,477 | 4/1986 | Hartman | 403/324 |

FOREIGN PATENT DOCUMENTS

| | | | |
|---|---|---|---|
| 24729 | 3/1981 | European Pat. Off. | 403/374 |
| 551841 | 1/1923 | France | 403/379 |
| 450881 | 8/1949 | Italy | 403/374 |
| 0207120 | 12/1983 | Japan | 74/473 R |
| 6025025 | 2/1985 | Japan. | |

Primary Examiner—Leslie A. Braun
Assistant Examiner—Scott Anchell
Attorney, Agent, or Firm—Fleit, Jacobson, Cohn, Price, Holman & Stern

[57] ABSTRACT

A shift lever assembly for an automotive transmission including a lower shift lever for engaging and operating an automotive transmission to select a desired gear stage. An upper shift lever is detachably coupled to the lower lever and serves for manual actuation to effect movement of the lower shift lever. One of the upper and lower shift levers terminates at one end in a shaft. The other of the upper and lower shift levers terminates at one end in a bore into which is received the shaft. The coupling is effected by a fastener that cams and secures the shaft in the bore. The coupling may be easily detached.

34 Claims, 4 Drawing Sheets

SHIFT LEVER ASSEMBLY AND METHOD OF ASSEMBLING

BACKGROUND OF THE INVENTION

1. Field of the Invention

The present invention relates to a shift lever assembly for a manually activated automotive transmission for selecting a desired gear stage, and its method of assembly. More particularly, the present invention relates to a shift lever assembly having its lower portion mounted on a transmission body and operatively connected with the transmission. An upper lever portion of the shift lever assembly is detachably connected to the lower portion of the shift lever assembly to facilitate assembly.

2. Description of the Prior Art

Automotive transmissions having a shift lever mounted thereon for manually selecting a desired gear stage are notoriously old. Usually, the shift lever is long in configuration and protrudes upwardly from the rear end of the transmission. Transporting such transmissions from a stock supply to an automobile assembly line, and setting in an automobile body, is difficult and awkward. For this reason, it has already been proposed to provide a shift lever assembly consisting of a lower lever installed on the transmission body and an upper lever removably connected with the lower lever. By these arrangements, transport of the transmission and setting same in the automobile body are greatly facilitated. The upper lever is removed from the lower lever during transport and reconnected when the transmission has been put in place in the automobile body.

Known couplings for connecting the upper lever with the lower lever include use of splines on the outer surface of the lower end of the upper lever, and mating splines on the inner surface of the upper end of the lower lever, and fastening the two levers together by bolts and the like.

Another technique for coupling is shown in Japanese Utility Model Application No. 58-114396 filed on July 25, 1983 and published for public inspection on Feb. 20, 1985 under the Disclosure No. 60-25025. This coupling is generally shown in FIG. 6 of the present application and designated prior art. As shown, the upper lever of the coupling is connected with the lower lever by an internally threaded cap nut D. An enlarged shaft E threaded at its free end is secured on the upper end portion of the lower lever A. Projections B, having a rectangular cross section, extend from the free end of shaft E and are received in a bore having a rectangular cross section defined in lower end portion C' welded to the lower end of upper lever C. Cap nut D engages with a shoulder formed on lower end portion C' as it is screwed onto the threads of shaft E.

In the arrangement where the upper lever and the lower lever are connected by splines, the manufacturing of these splines is too difficult, time-consuming and labor intensive. When using a cap nut for connecting the upper lever C with the lower lever A, as shown in FIG. 6, the cap nut may loosen easily due to frequent operation of shift lever and vibration. If the cap nut becomes loose, fluctuation between the upper lever C and the lower lever A will result and the feel of the shift lever to the driver will become extremely desensitized.

SUMMARY OF THE INVENTION

The present invention overcomes the disadvantages of the prior art by providing a shift lever assembly that can be easily assembled, adjusted and secured, and to a method of assembling the shift lever assembly. Therefore, the principal object of the present invention is to provide a shift lever assembly for a manually actuated automotive transmission, wherein a lower lever installed on the transmission body is detachably coupled with an upper lever, is a simpler and more effectively secure manner than previously known in the art, and offers great advantages over the aforementioned spline engagement and cap nut arrangement.

This is accomplished in accordance with the principles of the present invention by providing a shift lever assembly for a manually actuated automotive transmission in which an upper lever and a lower lever are detachably coupled. One of the lower lever and the upper lever has a shaft portion on its end, and the other has an end that defines a bore that receives the shaft portion. A cutout is formed on a chord in the surface of said shaft portion, and a hole is formed through the end defining the bore. The hole lies normal to the bore and intercepts the shaft in the region of the cutout such that when a fastener or securing member having a tapered surface is inserted into the hole, the tapered surface coacts with the cutout to secure the shaft in the bore. The fastener member is threaded where it projects out from the hole remote from the tapered surface and a nut is threaded onto the threaded portion of the fastener member. Tightening the nut draws the member and the tapered surface into the hole to secure the shaft. Pins are provided to temporarily hold the components in appropriate juxtaposition to facilitate transport of the transmission to an assembly line and assembly of the shift lever assembly at the assembly line.

BRIEF DESCRIPTION OF THE DRAWINGS

The foregoing objects and advantages of the present invention will become more evident from the following detailed description of a preferred embodiment and certain variations thereof when taken in conjunction with the drawings in which.

DETAILED DESCRIPTION OF THE PREFERRED EMBODIMENTS

Figure 1:
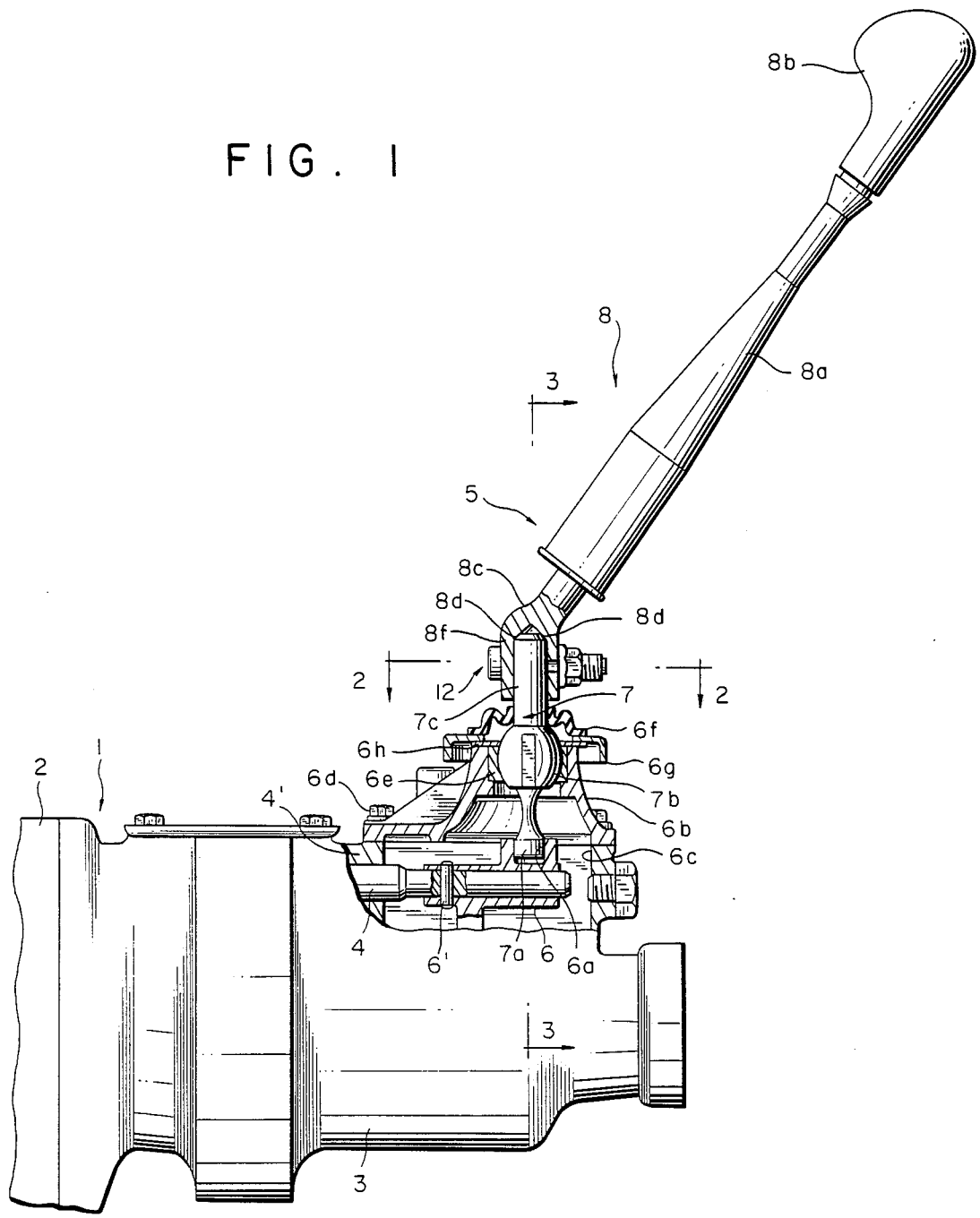
FIG. 1 is a side view partly in section of a manually operated transmission and shift lever assembly according to the teachings of the present invention.

Referring now to the drawings, FIGS. 1-4, 7 and 8 illustrate a transmission 1 with attached shift lever assembly 5 according to a preferred embodiment of the present invention. Transmission 1 consists of a transmission casing 2 and an extension housing 3 securely connected to the rear side of transmission casing 2. The details of the interior of transmission casing 2 and extension housing 3 are well known in the art. A control rod 4 is mounted in the extension housing 3 by suitable means including bearing 4'. Shift lever assembly 5 is installed on a rear upper side of the extension housing 3.

A sleeve 6 is rigidly connected by pin 6' with the rear end portion of the control rod 4. Sleeve 6 defines a socket or recess 6a on its upper side adjacent the end of sleeve 6 nearest the free end of the control rod 4. A cover 6b closes an opening 6c at the rear end of the extension housing 3. Cover 6b is secured to the extension housing 3 by suitable bolts 6d. The cover 6b is of frusto-conical configuration and extends upwardly terminating at its smaller end spaced above the extension housing 3. A ball or universal socket 6e is mounted at the smaller end of cover 6b.

Projecting through open upper end of cover 6b is lower lever part 7 of shift lever assembly 5. Lower lever part 7 consists of a lower stub 7a that fits into socket 6e, a ball 7b integrally connected on one side to stub 7a, and a shaft 7c integrally connected to the upper side of ball 7b. Ball 7b fits into socket 6e to form the universal joint.

A corrugated rubber seal or diaphragm 6f is engaged or attached to shaft 7c at its inner edge and to the top of cover 6b at its outer edge. Cowl 6g serves as an added security for protecting against foreign matter entering into the upper end of cover 6b. Spacer 6h holds socket 6e in position against a shoulder defined by cover 6b.

Through the mechanism of the universal joint as described, motions imparted to shaft 7c are transmitted via the universal joint to stub 7a and via socket 6e to sleeve 6 and via pin 6' to control rod 4. Thus, control rod 4 can be rotated and reciprocated back and forth in response to the lateral and longitudinal movements of lower lever part 7.

The upper lever part 8 consists of a long handle 8a terminating at its upper end in a knob 8b for a driver to manipulate and terminating at its lower end in an integral shaft 8c of smaller or reduced cross section that is bent to form an oblique shape. The lower bent portion 8f of shaft 8c defines an open ended axial bore 8d and further defines on one side a projecting knuckle 8e. A transverse or lateral bore 11 is defined through knuckle 8e to intercept bore 8d along a chord. Bore 11 is of reduced section as indicated at 17 to define a shoulder 17a in the wall of lower bent portion 8f. The axis of reduced section 17 of bore 11 is laterally displaced from the main axis of bore 11.

The shaft 7c is received in the axial bore 8d. Shaft 7c has cutout 7d along a chord and is positioned in bore 8d with cutout 7d lying in the plane of bore 11 but at a small acute angle to the axis of bore 11. This will be evident in FIG. 2.

A fastener or securing member 12 consists of a larger diameter end 12a and a smaller diameter end 12b which is threaded as indicated by reference numeral 12c. The axis of smaller diameter end 12b is laterally displaced from the main axis of larger diameter end 12a on the same basis in the same way as the axes of main bore 11 and reduced section 17 are laterally displaced. The fastener 12 fits into bore 11 extending or projecting from either side. End 12a matches the larger cross section of bore 11 and end 12b matches the smaller cross section of reduced section 17. The larger end 12a is provided with a tapered cutout 12d which extends from the shoulder 12e defined between the ends 12a and 12b to about the midpoint of end 12a. Since cutout 7d of shaft 7c is positioned to lie adjacent the wall portion defining bore 11, cutout 12d of fastener 12 engages and bears against cutout 7d. A nut 13 is threaded onto threaded end 12b and, when the nut 13 is tightened, it draws fastener 12 into bore 11 causing cutout 12d to cam and wedge against cutout 7d of shaft 7c holding same securely in position. Since the axes of the fastener ends and bore 11 and reduced section 17 are laterally offset, the insertion of fastener 12 automatically orients it into the correct position for cutout 12d to engage cutout 7d.

Figure 2:
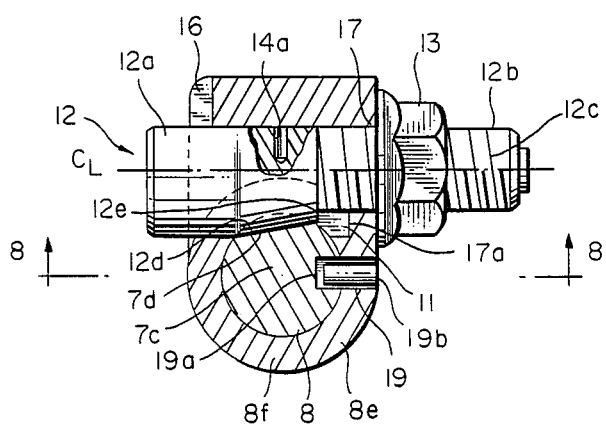
FIG. 2 is a sectional view of FIG. 1 taken along line 2—2 of FIG. 1.
Figure 3:
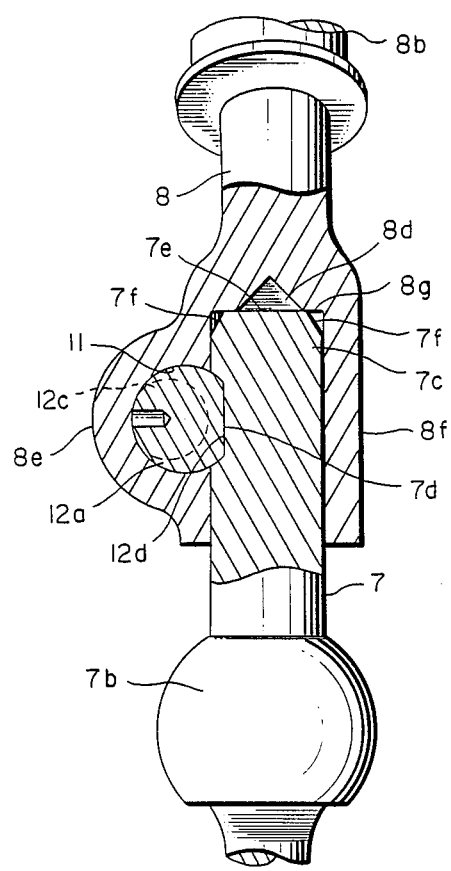
FIG. 3 is a sectional view taken along line 3—3 of FIG. 1.
Figure 8:
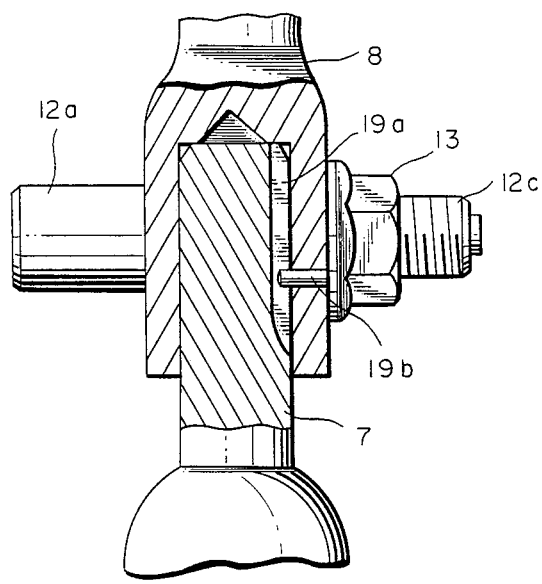
FIG. 8 is a sectional view taken along line 8—8 of FIG. 2.

Referring to FIGS. 2 and 8, a bore 19 is defined in the wall of the lower bent part or portion 8f about 90° removed from knuckle 8e and a matching or registering slot 19a is defined in shaft 7c. A pin 19b is press fitted into bore 19 and is received in slot 19a extending from the free end of shaft 7c to a point below pin 19b as viewed in FIG. 8 to prevent any relative rotation between shaft 7c and the lower bent part 8f.

Figure 4:
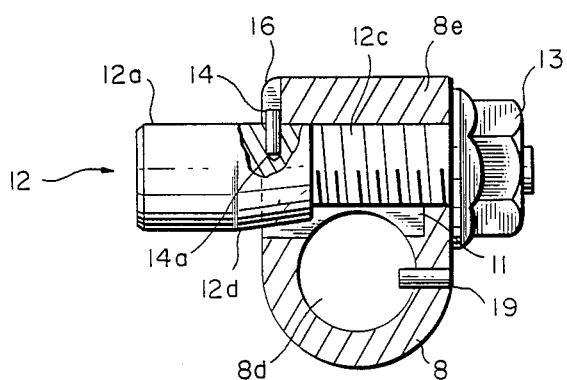
FIG. 4 is a sectional view similar to FIG. 2 with the lower lever part omitted and the end portion of the upper lever part defining the bore in the condition before insertion and connection of the lower lever part.
Figure 7:
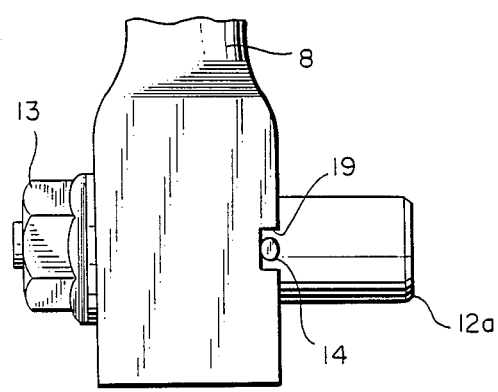
FIG. 7 is a side elevational view of FIG. 4.

Reference is now made to FIGS. 4 and 7 to explain how the transmission and shift lever assembly are assembled on an assembly line. In stock, the upper lever 8 and lower lever 7 are decoupled. The transmission 1 with lower lever 7 mounted thereon is brought from stock or inventory and mounted onto an automobile frame and body at the appropriate time and place in the production line during the assembly operation. The upper lever 8, in the condition illustrated in FIG. 4, is then assembled to lower lever 7. Before assembly, the fastener 12 is mounted in bore 11. In this condition, the fastener 12 is positioned in bore 11 so that the large end 12a is clear of bore 8d. The knuckle 8e is cut out at 16 to expose a portion of large end 12a of fastener 12 and expose a bore or recess 14a formed in the exposed portion of large end 12a. A removable pin 14 is received in bore 14a to prevent the fastener 12 from moving into the bore 11 and producing a conflict or interference with bore 8d. Fastener 12 is held stationary or firm between pin 14 and nut 13. The upper lever 8 is now assembled or coupled to the lower lever 7 by inserting the axial bore 8d over the shaft 7c. During insertion, press fit pin 19b enters the end of slot 19a and is guided along slot 19a as the shaft 7c proceeds into axial bore 8d. Shaft 7c extends into axial bore 8d until the free end 7e which is chamfered at 7f strikes the end 8g of bore 8d. At this time, cutout 7d will be in an interference or conflict condition with cutout 12d of fastener 12. Pin 14 is now withdrawn and nut 13 tightened drawing fastener 12 into bore 11 until cutout 12d engages, wedges and cams cutout 7d of shaft 7c to secure or look shaft 7c in place.

Figure 5:
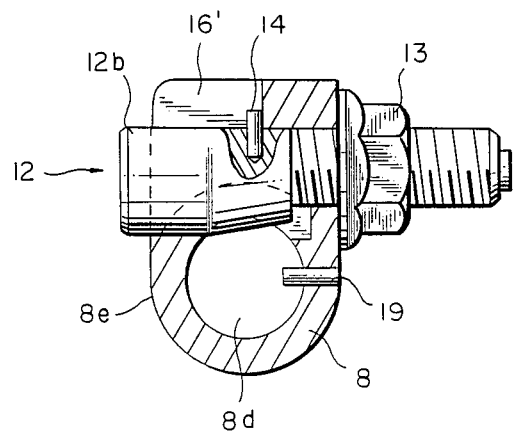
FIG. 5 is a sectional view similar to FIG. 4 showing another embodiment of the present invention.
Figure 6:
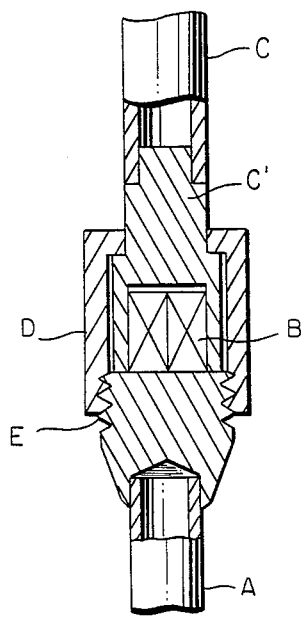
FIG. 6 is a sectional view showing coupling of the upper and lower shift levers according to prior art teachings.

FIG. 5 shows an alternative arrangement for holding fastener 12 prior to the assembly of upper lever 8 to lower lever 7. As shown, the knuckle 8e is provided with a slot 16' extending for a distance greater than the movement of fastener 12 when it wedges and cams against shaft 7c. The removable pin 14 is not intended to be removed, but may stay permanently in place. In the condition shown, the fastener 12 is held tight because nut 13 has been tightened sufficiently to draw pin 14 against the end of the slot 16'. To prepare for assembly, nut 13 must be unthreaded sufficiently to allow fastener 12 to be retracted from bore 11 to clear bore 8d. At this time, bore 8d is fitted over shaft 7c and nut 13 tightened to effect the wedging and camming. Pin 14 is not removed.

Figure 9:
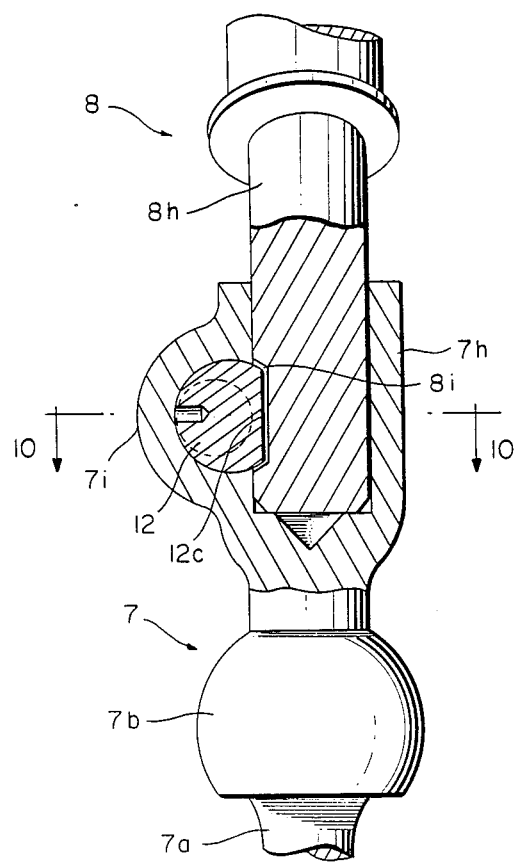
FIG. 9 is a sectional view similar to FIG. 3 showing a variation of the present invention.
Figure 10:
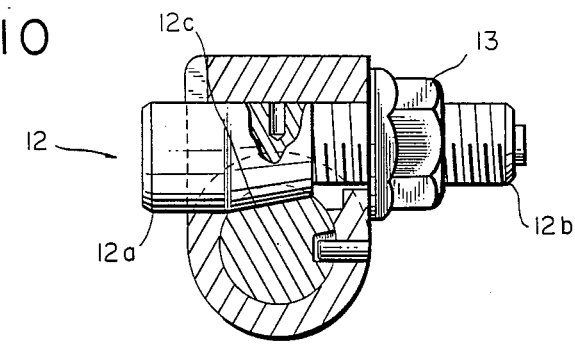
FIG. 10 is a sectional view taken along line 10—10 of FIG. 9.

FIGS. 9 and 10 illustrate a modification where the shaft 8h (like shaft 7c) is the lower end part of upper lever 8 and the cup 7h with knuckle 7i (like lower bent portion 8f, bore 8d and knuckle 8e) is the upper end of lower lever 7. Shaft 8h has a cutout 8i that coacts with cutout 12c to secure shaft 8h in cup 7h. As will be evident, the coupling is upside down relative to FIG. 1. Like parts have been given the same reference numerals. The embodiment of FIG. 1 is considered superior to the embodiment of FIG. 9 because the bellows 6f can be assembled over shaft 7c and the knuckle does not produce a conflict or interference with diaphragm, bellows or seal 6f.

Figure 11:
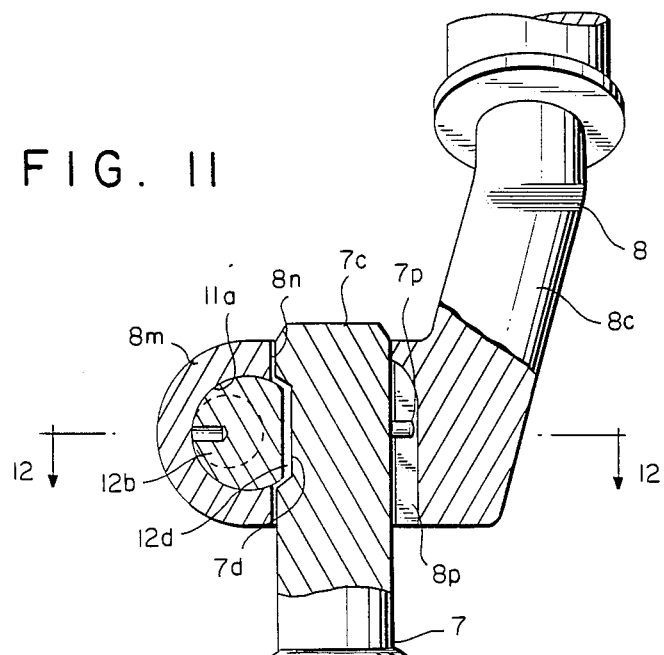
FIG. 11 is a sectional view similar to FIG. 3 showing a further variation of the present invention.
Figure 12:
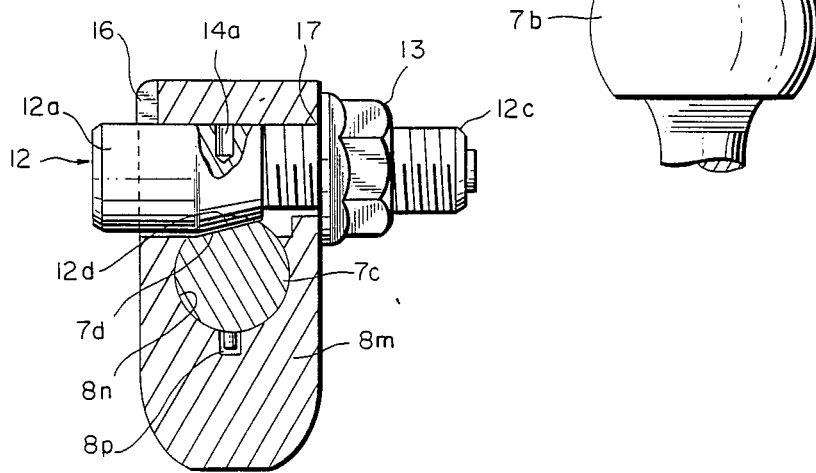
FIG. 12 is a sectional view taken along line 12—12 of FIG. 11.

FIGS. 11 and 12 illustrate a further modification of the invention. The embodiment illustrated is like FIG. 1 with the following refinement. Shaft 8c is bent at near a right angle at its end to form horizontal portion 8m. Portion 8m defines a through bore 8n that receives shaft 7c. Bore 8n is enlarged along one side by slot 8p that coacts with a pin 7p press fitted into shaft 7c to serve the function of preventing relative rotation of shaft 7c and portion 8m. A transverse or lateral bore 11a like bore 11 is formed in the end of portion 8m and receives fastener 12. The constructional details are otherwise as described.

Although the present invention has been described with respect to preferred embodiments, it will be evident to those skilled in the art that changes and modifications are possible which do not depart from the spirit and scope of the invention. Such are deemed to fall within the purview of the invention.

What is claimed is:

1. A shift lever assembly for an automotive transmission comprising a lower shift lever means for engaging and operating an automotive transmission to select a desired gear stage, an upper shift lever means for manual actuation to effect movement of said lower shift lever means to operate the automotive transmission, and coupling means to couple the upper and lower shift lever means, one of said upper and lower shift lever means terminating at one end in a shaft portion, the other of said upper and lower shift lever means terminating at one end in an end portion defining a bore into which is received said shaft portion, said coupling means comprising camming and securing means for mutually coacting with said shaft portion and said end portion to secure same together while enabling easy detachment, said camming and securing means including a through bore defined in said end portion intercepting said bore along a chord, a fastener member fitted into said through bore, and a cutout being provided in said shaft portion lying in the plane of said chord which is engaged by said fastener member, and fastener member holding means for preventing movement of said fastener member relative to said through bore from a pre-assembly position prior to assembly of said upper shift lever to said lower shift lever.

2. A shift lever assembly according to claim 1 wherein said fastener member includes a tapered cutout which engages with said cutout of said shaft portion.

3. A shift lever assembly according to claim 1 wherein said through bore includes a larger cross section portion and a smaller cross section portion, and said fastener member has a larger diameter end and a smaller diameter end, and wherein said larger and smaller diameter ends match said larger and smaller cross section portions, respectively.

4. A shift lever assembly according to claim 3 wherein said fastener member includes a tapered cutout which engages with said cutout of said shaft portion extending from a shoulder defined between said larger and smaller diameter ends to about the midpoint of said larger diameter end.

5. A shift lever assembly according to claim 3 wherein the longitudinal axes of said larger and smaller cross section portions are offset from each other.

6. A shift lever assembly according to claim 3 wherein said smaller diameter end includes a threaded portion and a threaded nut coacts with said threaded portion.

7. A shift lever assembly according to claim 1 further including rotation preventing means for preventing relative rotation between said shaft portion and said end portion.

8. A shift lever assembly according to claim 7 wherein said rotation preventing means includes a pin mounted in one of said shaft portion and said end portion, and slot means defined by the other of said shaft portion and said end portion for receiving said pin.

9. A shift lever assembly according to claim 1 further including stop means mutually defined by said end portion and said shaft portion to locate said portions relative to each other to facilitate securing by said camming and securing means.

10. A shift lever assembly according to claim 9 wherein the stop means is defined by the bottom of said bore and the free end of said shaft portion.

11. A shift lever assembly according to claim 1 wherein said fastener member does not obstruct said bore when said fastener member is in the pre-assembly position.

12. A shift lever assembly according to claim 1 wherein said fastener member holding means includes a pin receiving bore defined in said fastener member with a removable pin received in said pin receiving bore in the pre-assembly position prior to assembly of said upper shift lever to said lower shift lever, pin receiving cutout means defined in said end portion receiving said removable pin prior to the assembly of said upper shift lever to said lower shift lever, and pin drawing means for drawing said removable pin against a surface of said pin receiving cutout means in the pre-assembly position prior to assembly of said upper shift lever to said lower shift lever.

13. A shift lever assembly according to claim 12 wherein said pin drawing means includes a threaded portion defined on said fastener member, and a threaded nut threadedly engaged and coacting with said threaded portion.

14. A shift lever assembly according to claim 1 wherein said fastener member holding means includes a pin receiving bore defined in said fastener member, a drawing pin received in said pin receiving bore, pin receiving cutout means defined in said end portion receiving said drawing pin and extending for a distance greater than the movement of said fastener member when said fastener member wedges against said cutout of said shaft portion, pin drawing means for drawing said drawing pin against a surface of said pin receiving cutout means in the pre-assembly position prior to assembly of said upper shift lever to said lower shift lever.

15. A shift lever assembly according to claim 14 wherein said pin drawing means includes a threaded portion defined on said fastener member, and a threaded nut threadedly engaged and coacting with said threaded portion.

16. A shift lever assembly for an automotive transmission according to claim 1 wherein the lower shift lever extends upwardly from a cover secured to a housing of said automotive transmission and terminates at one end in a shaft portion, and the upper shift lever terminates in the end portion defining a bore into which is received said shaft portion.

17. A shift lever assembly according to claim 16 wherein said end portion includes a projecting knuckle defined on one side of said end portion, and said through bore being defined through said projecting knuckle to intercept said bore along a chord.

18. A shift lever assembly according to claim 1 further including a cover secured to a housing of the automotive transmission and a rubber seal sealing said lower shift lever and said cover.

19. A shift lever assembly for an automotive transmission comprising a lower shift lever means for engaging and operating an automotive transmission to select a desired gear stage, an upper shift lever means for manual actuation to effect movement of said lower shift lever means to operate the automotive transmission, and coupling means to couple the upper and lower shift lever means, one of said upper and lower shift lever means terminating at one end in a shaft portion, the other of said upper and lower shift lever means terminating at one end in an end portion defining a bore into which is received said shaft portion, said coupling means comprising camming and securing means for mutually coacting with said shaft portion and said end portion to secure same together while enabling easy detachment, said camming and securing means including a through bore defined in said end portion intercepting said bore along a chord, a fastener member fitted into said through bore, and a cutout being provided in said shaft portion lying in the plane of said chord which is engaged by said fastener member, said fastener member including a tapered cutout which engages with said cutout of said shaft portion, and rotation preventing means for preventing relative rotation between said shaft portion and said end portion, said rotation preventing means including a pin mounted in one of said shaft portion and said end portion, and the other of said shaft portion and said end portion having slot means extending in an axial direction for receiving said pin when said upper shift lever means is assembled to said lower shift lever means.

20. A shift lever assembly according to claim 19 wherein said through bore includes a larger cross section portion and a smaller cross section portion, and said fastener member has a larger diameter end and a smaller diameter end, and wherein said larger and smaller diameter ends match said larger and smaller cross section portions, respectively.

21. A shift lever assembly according to claim 20 wherein said fastener member includes a tapered cutout which engages with said cutout of said shaft portion extending from a shoulder defined between said larger and smaller diameter ends to about the midpoint of said larger diameter end.

22. A shift lever assembly according to claim 20 wherein the longitudinal axes of said larger and smaller cross section portions are offset from each other.

23. A shift lever assembly according to claim 20 wherein said smaller diameter end includes a threaded portion and a threaded nut coacts with said threaded portion.

24. A shift lever assembly according to claim 19 further including stop means mutually defined by said end portion and said shaft portion to locate said portions relative to each other to facilitate securing by said camming and securing means.

25. A shift lever assembly according to claim 24 wherein the stop means is defined by the bottom of said bore and the free end of said shaft portion.

26. A shift lever assembly for an automotive transmission comprising a lower shift lever means for engaging and operating an automotive transmission to select a desired gear stage, an upper shift lever means for manual actuation to effect movement of said lower shift lever means to operate the automotive transmission, and coupling means to couple the upper and lower shift lever means, one of said upper and lower shift lever means terminating at one end in a shaft portion, the other of said upper and lower shift lever means terminating at one end in an end portion defining a bore into which is received said shaft portion, said coupling means comprising camming and securing means for mutually coacting with said shaft portion and said end portion to secure same together while enabling easy detachment, said camming and securing means including a through bore defined in said end portion intercepting said bore along a chord, a fastener member fitted into said through bore, and cutout being provided in said shaft portion lying in the plane of said chord which is engaged by said fastener member, said fastener member including a tapered cutout which engages with said cutout of said shaft portion, and rotation preventing means for preventing relative rotation between said shaft portion and said end portion, said rotation preventing means including a pin mounted in one of said shaft portion and said end portion, and slot means defined by the other of said shaft portion and said end portion for receiving said pin, the shift lever assembly further including fastener member holding means for preventing movement of said fastener member relative to said through bore from a preassembly position prior to assembly of said upper shift lever to said lower shift lever.

27. A shift lever assembly according to claim 26 wherein said fastener member does not obstruct said bore when said fastener member is in the pre-assembly position.

28. A shift lever assembly according to claim 27 wherein said fastener member holding means includes a pin receiving bore defined in said fastener member with a removable pin received in said pin receiving bore in the pre-assembly position prior to assembly of said upper shift lever to said lower shift lever, pin receiving cutout means defined in said end portion receiving said removable pin prior to the assembly of said upper shift lever to said lower shift lever, and pin drawing means for drawing said removable pin against a surface of said pin receiving cutout means prior to the assembly of said upper shift lever to said lower shift lever.

29. A shift lever assembly according to claim 28 wherein said pin drawing means includes a threaded portion defined on said fastener member, and a threaded nut threadedly engaged and coacting with said threaded portion.

30. A shift lever assembly according to claim 26 wherein said fastener member holding means includes a pin receiving bore defined in said fastener member, a drawing pin received in said pin receiving bore, pin receiving cutout means defined in said end portion receiving said drawing pin and extending for a distance greater than the movement of said fastener member when said fastener member wedges against said cutout of said shaft portion, pin drawing means for drawing said drawing pin against a surface of said pin receiving cutout means in the pre-assembly position prior to assembly of said upper shift lever to said lower shift lever.

31. A shift lever assembly according to claim 30 wherein said pin drawing means includes a threaded portion defined on said fastener member, and a threaded nut threadedly engaged and coacting with said threaded portion.

32. A shift lever assembly for an automotive transmission according to claim 19 wherein the lower shift lever extends upwardly from a cover secured to a housing of said automotive transmission and terminates at one end in a shaft portion, and the upper shift lever terminates at one end in the end portion defining a bore into which is received said shaft portion.

33. A shift lever assembly according to claim 32 further including a rubber seal sealing said shaft portion and said cover.

34. A shift lever assembly according to claim 32 wherein said end portion includes a projecting knuckle defined on one side of said end portion, and said through bore being defined through said projecting knuckle to intercept said bore along a chord.

* * * * *